United States Patent [19]

Frost

[11] Patent Number: 5,105,927

[45] Date of Patent: Apr. 21, 1992

[54] SINGLE CONE SERVO ACTION SYNCHRONIZER

[75] Inventor: Barry L. Frost, Dewitt, N.Y.

[73] Assignee: New Venture Gear, Inc., Troy, Mich.

[21] Appl. No.: 642,038

[22] Filed: Jan. 16, 1991

[51] Int. Cl.$^5$ .............................................. F16D 23/06
[52] U.S. Cl. ...................................... 192/53 F; 74/339
[58] Field of Search ............... 192/53 F, 53 E; 74/339

[56] References Cited

U.S. PATENT DOCUMENTS

| | | | |
|---|---|---|---|
| 2,238,723 | 4/1941 | Fishburn | 192/53 F X |
| 2,369,842 | 2/1945 | Neracher et al. | 192/53 F |
| 2,896,760 | 6/1959 | Hebbinghaus | 192/53 F |
| 4,349,090 | 9/1982 | Griesser | 192/53 F X |
| 4,732,247 | 3/1988 | Frost | 192/53 F |

Primary Examiner—Richard Lorence
Attorney, Agent, or Firm—Harness, Dickey & Pierce

[57] ABSTRACT

An improved single cone servo-action synchronizer apparatus having a hub fixed for rotation to a transmission shaft and an outer blocker ring and a ratio gear concentrically disposed on the transmission shaft. The blocker ring is formed with a plurality of longitudinally extending drive tangs which project into apertures formed in the hub. The drive tangs have an angled cam edge which converges outwardly at a first acute angle. The apertures have a complimentary angled side which is adapted for sliding engagement with the drive tang cam edge upon energization of the synchronizer apparatus. This sliding engagment causes the torque capacity of the synchronizer apparatus to be increased for a given input synchronizing force.

12 Claims, 5 Drawing Sheets

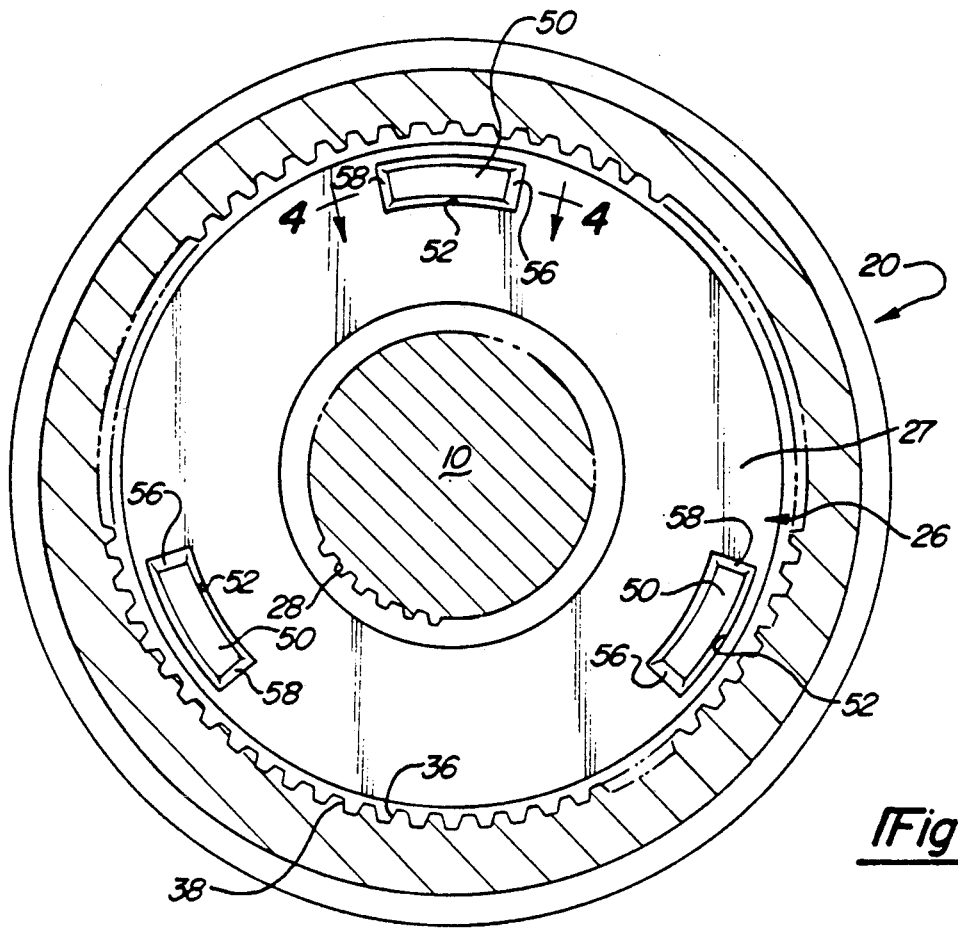
*Fig-3*
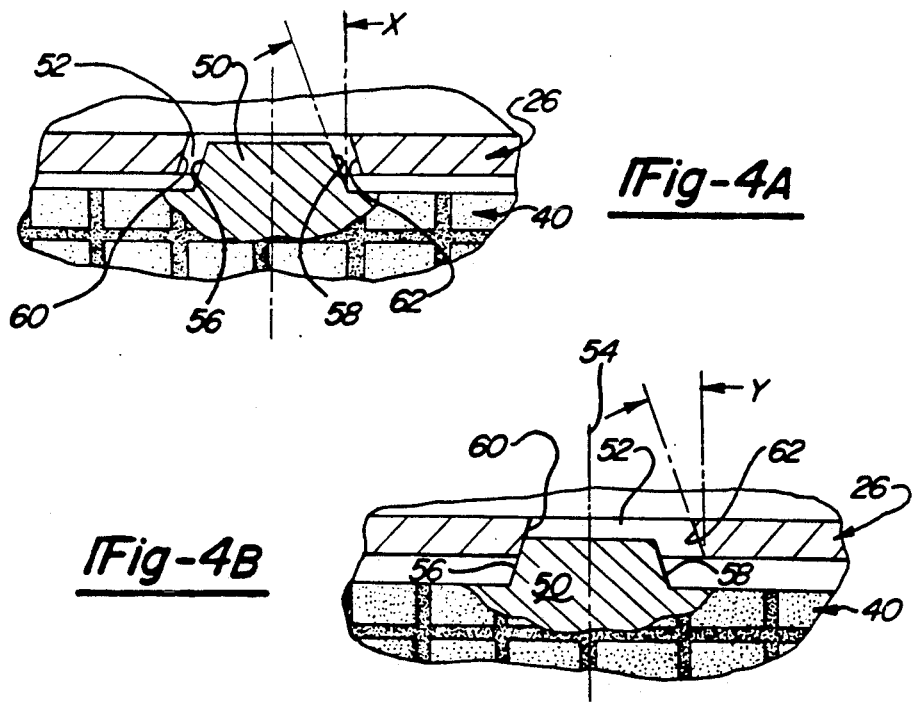
*Fig-4A*
*Fig-4B*

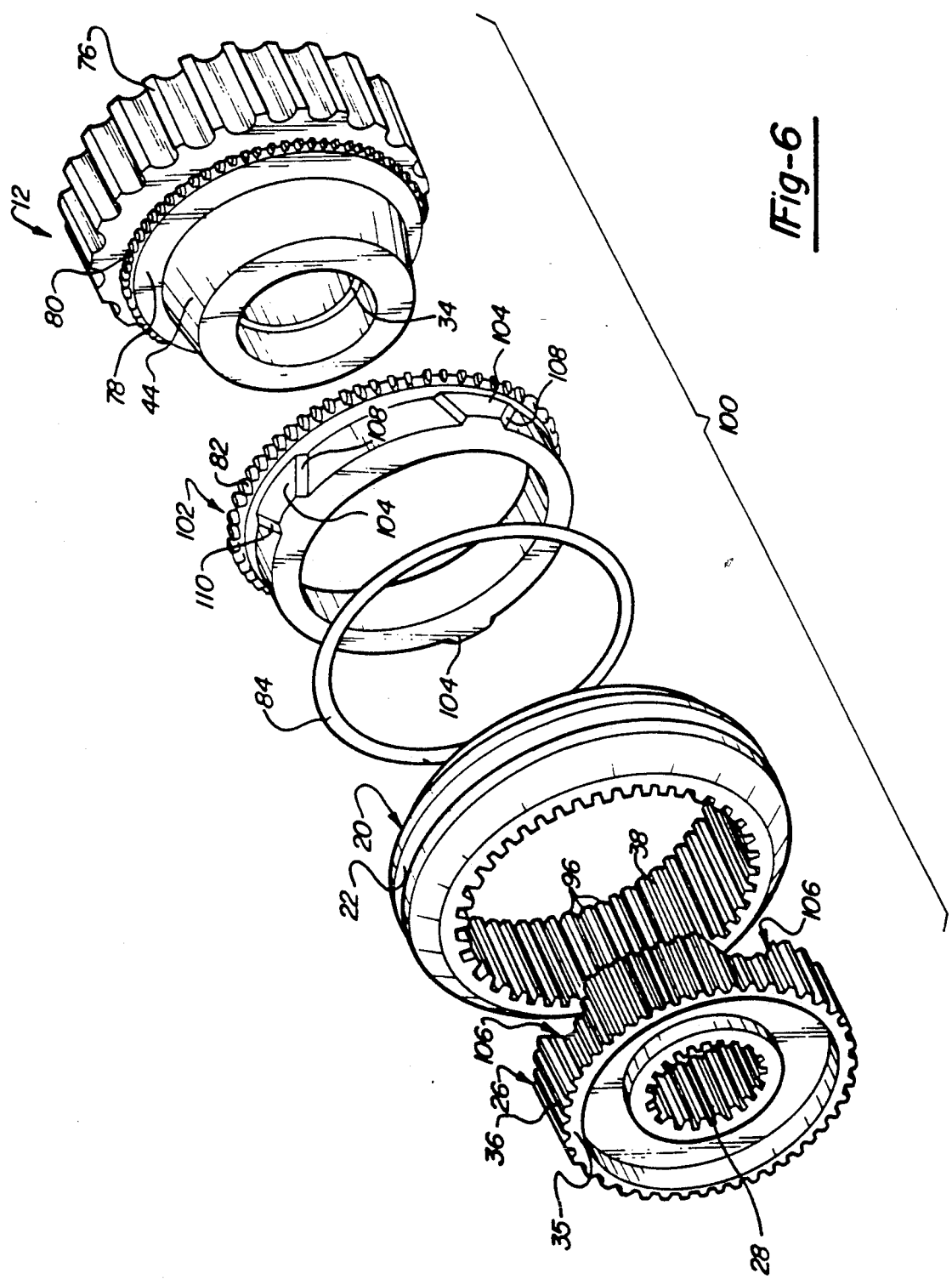

SINGLE CONE SERVO ACTION SYNCHRONIZER

BACKGROUND OF THE INVENTION

The present invention relates to cone-type synchronizers for manual transmissions and, more particularly, to an improved single-cone synchronizer mechanism incorporating servo action.

In general, most synchronizer mechanisms typically used in manual transmissions and transfer cases are either of the "strut" or "strutless" types. Strutless synchronizers, such as disclosed in U.S. Pat. No. 3,700,083 issued Oct. 29, 1972 to N. Ashikawa, et al. typically employ a thrust member, such as an annular spring, interposed between a clutch sleeve and a blocker ring. The annular spring is mounted on the outer surface of a plurality of uniformly spaced lugs integrally formed on the blocker ring. Upon axial movement of the clutch sleeve the annular spring acts on the blocker ring to energize the synchronizer mechanism for generating sufficient cone torque to "clock" the blocker ring to a blocking position. Once synchronization is complete, the clutch sleeve passes over the annular spring and into lock-up engagement with a ratio gear such that torque is transmitted to the driven gear.

Strut-type synchronizers, such as disclosed in U.S. Pat. No. 4,566,568 issued Jan. 28, 1986 to Yant include a spring member radially interposed between the hub and the clutch sleeve for biasing a strut radially outwardly into engagement with a detent groove formed in the inner bore of the clutch sleeve. Axial displacement of the clutch sleeve causes the strut to act on the blocker ring for energizing the synchronizer mechanism to block further axial displacement of the clutch sleeve until speed synchronization is complete.

A primary design constraint associated with many conventional cone-type synchronizers however, is their inability to generate sufficient synchronizing torque capacity. This is due largely to dimensional limitations associated with the friction generating components utilized within the synchronizer mechanism. Typically, the "input" force applied by the vehicle operator during a gear shift is the only force exerted for generating the frictional "cone" torque required for speed synchronization.

SUMMARY OF THE INVENTION

It is therefore an object of this invention to overcome the disadvantages associated with the prior art by providing an improved single-cone synchronizer mechanism having torque amplification means for generating an increase in the frictional cone torque developed.

The present invention, in its disclosed preferred embodiment, is a single-cone synchronizer mechanism having a cone surface adapted for frictional engagement with a mating friction surface upon selective energization of the synchronizer mechanism. The cone surface is formed on an exterior surface of a ratio gear which is journally supported on a transmission shaft. The friction surface is formed on an interior surface of a blocker ring. Torque amplification means are provided for operatively coupling the blocker ring and the clutch hub to generate increased frictional engagement between the cone and friction surfaces upon energization of the synchronizer mechanism.

According to a preferred embodiment, the blocker ring has a plurality of axially projecting drive tangs each of which is disposed in a an aperture formed on a radial flange or "web" portion of the hub. Each drive tang defines a forward-angled cam edge which is operative to slidably engage a complimentary angled side wall of its associated aperture upon an axial shifting force being applied to the synchronizer mechanism by the vehicle operator. As the clutch sleeve is axially moved by the vehicle operator during a gear change, a thrust mechanism acts on the blocker ring to bring the blocker ring interior friction surface and the ratio gear exterior cone surface into engagement for developing frictional "cone" torque therebetween. As the transmission shaft rotates, the frictional "cone" torque developed causes the blocker ring to rotate or "clock" such that the forward-angled cam edge of the drive tangs engages an angled side wall of its corresponding apertures. Thereafter, continued energization of the synchronizer mechanism causes sliding movement of the forward-angled cam surface relative to the angled aperture side wall. This sliding engagement acts to increase the frictional clamping force generated between the ratio gear cone surface and the blocker ring friction surface thereby increasing (i.e., amplifying) the synchronizer torque capacity. As such, the increased frictional clamping force is a combination of the input force applied by the vehicle operator and an axially-directed force component generated by the "servo" action of the drive tangs slidably engaging the aperture side walls.

Further objects and advantages of the present invention will be apparent from the following description, reference being made to the accompanying drawings wherein a preferred embodiment of the present invention is clearly shown.

BRIEF DESCRIPTION OF THE DRAWINGS

FIG. 3 is a cross-sectional view taken along line 3—3 of FIG. 1;

FIG. 4A is a fragmentary cross-sectional view, with parts broken away, taken substantially along line 4—4 of FIG. 3;

FIG. 4B is a view similar to FIG. 4A, showing the blocker ring rotated wherein its forward-angled cam edge is in engagement with a complimentary angled side wall surface formed in the hub;

FIG. 6 is an exploded perspective view of an alternative preferred embodiment of the improved synchronizer mechanism;

DETAILED DESCRIPTION OF THE INVENTION

Figure 1:
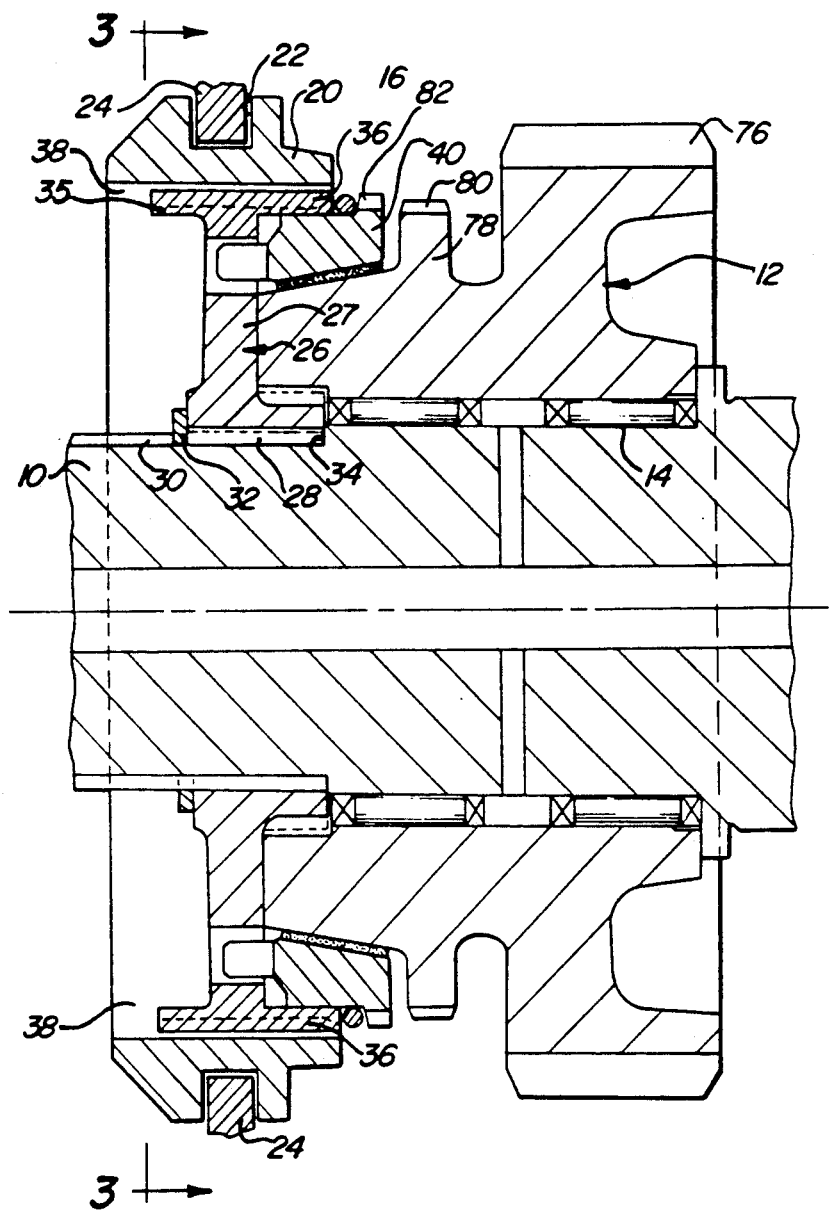
FIG. 1 is an axial longitudinal cross-sectional view of the improved synchronizer mechanism of the present invention.

Referring now to the drawings, there is seen in FIG. 1 a power transfer shaft 10 on which is rotatably supported a ratio gear 12 by means of needle bearings 14. Disposed on one side of ratio gear 12 is a synchronizer mechanism, generally indicated at 16, which is operable to cause selective speed synchronization between shaft 10 and ratio gear 12. Synchronizer mechanism 16 is operated through a shift sleeve 20 which is connected by a yoke groove 22 to a conventional mechanical shift fork mechanism, partially shown at 24.

In the disclosed embodiment, synchronizer unit 16 is commonly referred to as a "strutless" unit. It is to be understood that while synchronizer 16 of the present invention is shown incorporated in a single-sided unidirectional synchronizer arrangement, it could likewise be incorporated into a double-sided bi-directional clutch without departing from the fair scope of the present invention. Thus, for example, the principles incorporated into the improved synchronizer unit 16 could be used in a bi-directional synchronizer clutch in a manual transmission. It is likewise to be understood that the principles of the present invention are also readily adaptable for use with most strut-type synchronizer mechanisms.

Synchronizer mechanism 16 includes a clutch hub 26 having a radial inner web portion 27 fixed to shaft 10 through hub internal splines 28 engaging shaft external splines 30. A snap ring 32 retains and axially positions hub 26 on shaft 10 in cooperation with shoulder 34. Hub 26 also includes a longitudinally extending cylindrical portion 35 having an externally splined surface 36 formed thereon. Shift sleeve 20 is mounted for rotation with clutch hub 26 by means of its externally splined surface 36 being in sliding intermeshed engagement with internal splined surface 38 of shift sleeve 20. Thus, shift sleeve 20 is axially movable relative to hub 26 by means of corresponding movement of shift fork mechanism 24.

Figure 2:
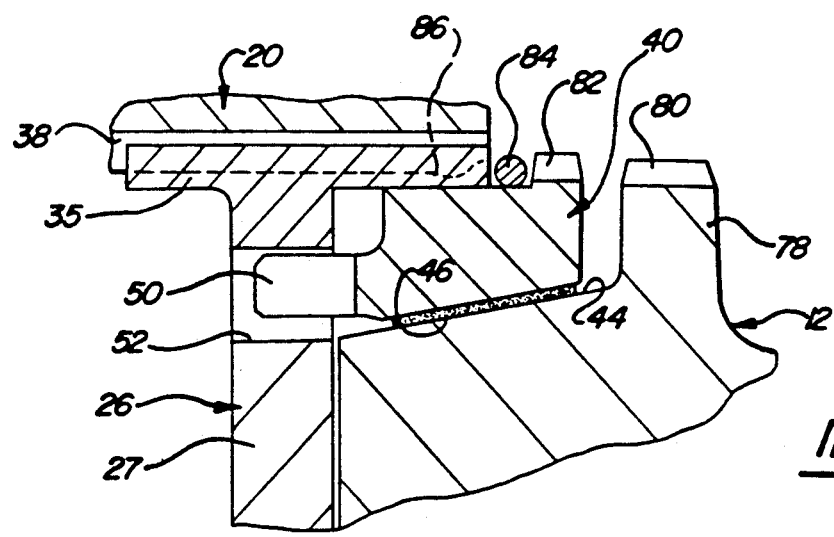
FIG. 2 is an enlarged fragmentary cross-sectional view of a portion of the improved synchronizer mechanism shown in FIG. 1.
Figure 5:
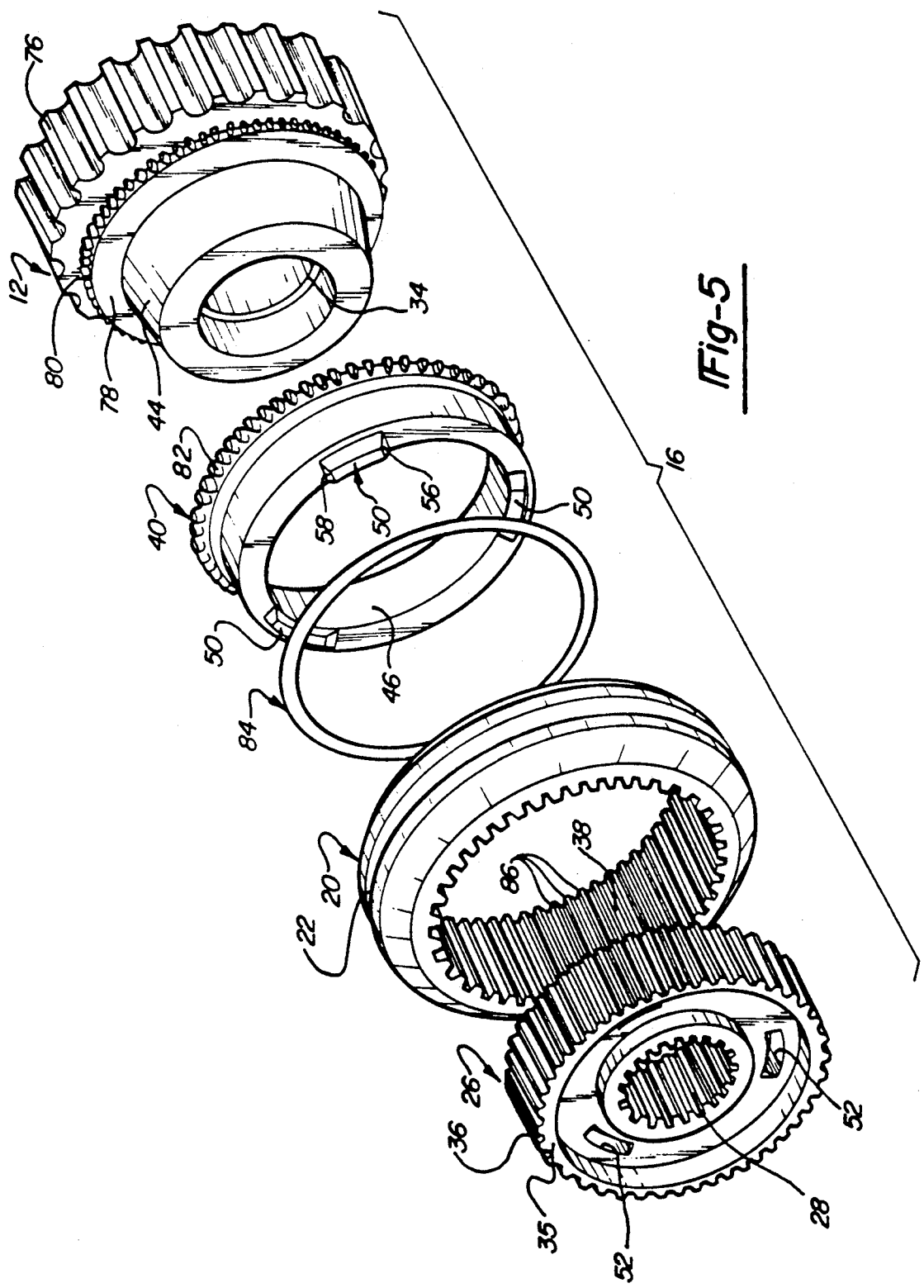
FIG. 5 is an exploded perspective view of the synchronizer mechanism shown in FIG. 1.

With particular reference to FIGS. 2 and 5, single-cone synchronizer unit 16 is shown as having a single cone surface 44 and a single corresponding friction surface 46. More particularly, cone surface 44 is illustrated as being formed on an exterior surface of ratio gear 12 with friction surface 46 being formed on an interior surface of blocker ring 40. Friction surface 46 is adapted to contact cone surface 44 upon energization of synchronizer mechanism 16. It will be noted that in the disclosed embodiment, friction surface 46 is in the form of a friction pad or lining bonded or cemented to the interior conical surfaces of blocker ring 40 for providing effective frictional engagement. An example of one type of suitable friction lining that may be used with the present invention is disclosed in U.S. Pat. No. 4,267,912 issued May 29, 1981 to Bauer, et al, the disclosure of which is expressly incorporated by reference herein.

In accordance to the teachings of the present invention, torque amplification means are provided for amplifying the frictional "clamping" engagement generated between cone surface 44 and friction surface 46 upon the vehicle operator selectively shifting clutch sleeve 20 to produce an increased torque capacity in single-cone synchronizer mechanism 16. More particularly, blocker ring 40 is shown to include a plurality of three (3) axially projecting torque drive tangs 50 formed integrally therewith and which are uniformly spaced on 120° centers. Torque drive tangs 50 extend generally parallel to and concentrically about a principal longitudinal axis of shaft 10 and are adapted to nest in an aperture or window 52 formed in an inner web portion 27 of clutch hub 26.

With particular reference now to FIGS. 4A, 4B and 5, each drive tang 50 is shown to define at least one angled cam edge surface provided for engaging a similarly angled side wall surface of window 52. Preferably, drive tangs 50 are formed symmetrically about a longitudinal axis of symmetry which coincides with an axial center line 54. As such, drive tangs 50 define a pair of forward-angled cam edges 56 and 58 which are shown to converge outwardly from center line 54 at a predetermined acute angle "X" which, in the disclosed embodiment, defines an acute angle in the range of about 5° to 20°. More preferably, acute angle "X" is in the range of about 8° to 10°. It will be noted that window 52 defines angled side walls 60 and 62 each of which are disposed at a predetermined acute angle "Y" (FIG. 4B). Preferably, acute angles "X" and "Y" match or are substantially equal to permit sliding engagement upon contact therebetween. Initial contact between drive tangs 50 and a side wall of windows 52 occurs upon indexing or "clocking" of blocker ring 40 as will be hereinafter described.

As best seen in FIGS. 1 and 5, ratio gear 12 has a toothed outer diameter 76 adapted to mesh with, or interconnect, other gear members in a well-known manner. Also, a flange portion 78 of ratio gear 12 has a toothed or spline surface 80 which is coaxial and alignable with a toothed or splined surface 82 formed on the outer circumference of synchronizer blocker ring 40. Both toothed surfaces 80 and 82 are engageable with a toothed surface defined by the shift sleeve internal splines 38. As noted, interval splines 38 are in continual engagement with external splines 36 formed on hub 26.

According to the disclosed embodiment, synchronizer mechanism 16 is of the "strutless" type having a thrust mechanism for causing energization thereof. The thrust mechanism includes an annular spring 84 mounted on blocker ring 40. Annular spring 84 is formed with a predetermined internal diameter such that it is slidably received on an exterior surface of blocker ring 40 in a snug press-fit manner. The function of annular spring 84 is generally set forth in U.S. Pat. No. 3,700,083 issued Oct. 24, 1972 to Askikawa, et al entitled "Synchromesh Transmission Apparatus". As shown and described therein, projections in the form of radial teeth portions 86 (see FIG. 2), are formed on the rightward end of sleeve internal splines 38.

As is known in the synchronizer art, upon shift sleeve 20 being shifted (either manually or automatically) from its neutral position (FIGS. 1, 2 and 4A), each set of radial teeth 86 contact annular spring 84. At this point, the running clearances between the axially movable parts have been taken up. Next, a detent load builds up as annular spring 84 is compressed radially by sleeve teeth 86. This radial compression of annular spring 84 generates initial "cone" torque between blocker ring interior friction surface 46 and ratio gear exterior cone surface 44. This initial "cone" torque causes blocker ring 40 to be rotated or "clocked" to an indexed position wherein forward-angled cam edges 56 slidably engage their associated window angled side walls 60 for drawing cone surface 44 into tighter frictional engagement with friction surface 46. This tighter "clamping" engagement results in an increased synchronizing torque for a given synchronizer axial input force exerted by the vehicle operator during a gear shift.

With blocker ring 40 in the indexed position, sleeve 20 now moves to a chamfer-to-chamfer loading position between the opposed faces of exterior toothed surface 82 on blocker ring 40 and shift sleeve interior toothed surface 38. When the speed of rotation of ratio gear 12 relative to blocker ring 40 and sleeve 20 approaches zero, the cone torque falls to substantially zero. Speed synchronization is now complete and blocker ring 40 is no longer energized such that blocker ring 40 moves aside to pass sleeve splines 38 onto toothed outer diameter 80 of ratio gear 12 for completing lock-up.

Figure 7A:
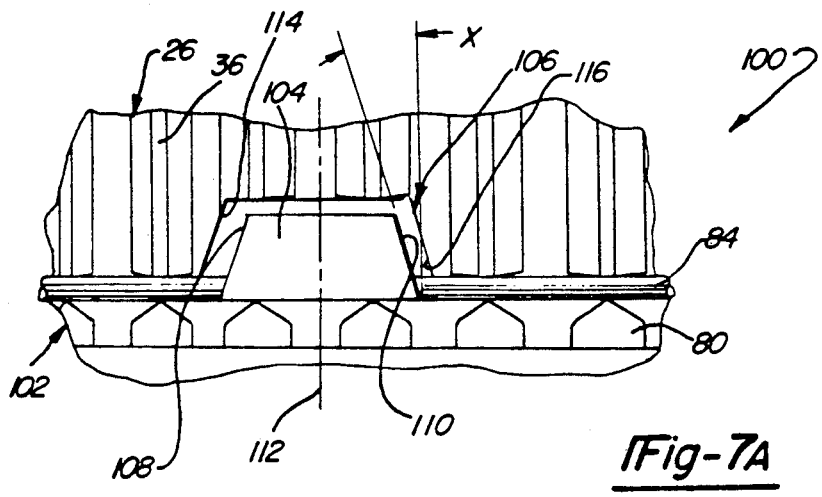
FIG. 7A is a top view of the improved synchronizer mechanism of FIG. 6, with the clutch sleeve removed, illustrating the drive tangs nested within notches formed in the hub.
Figure 7B:
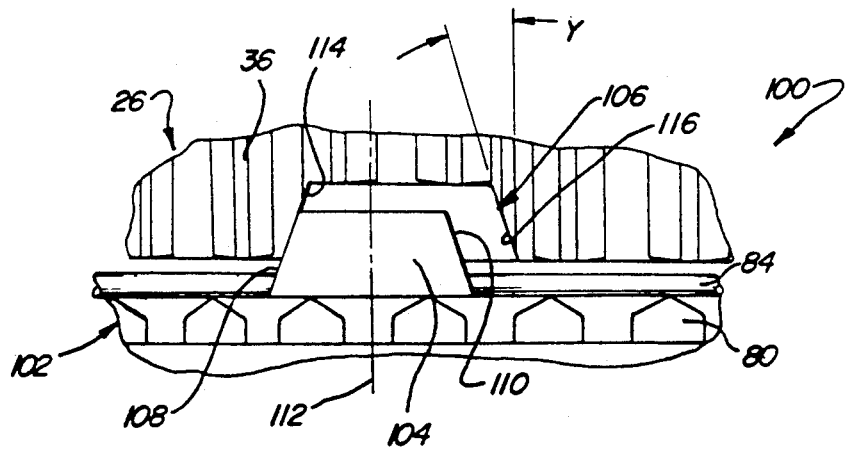
FIG. 7B is a view, similar to FIG. 7A, showing the blocker ring indexed for generating servo action due to sliding mating engagement of the drive tangs with the notches.

With particular reference now to FIGS. 6, 7A and 7B, an alternative embodiment of an improved single cone servo-action synchronizer mechanism 100 is shown. Since many of the components are substantially identical to those previously described and shown in FIGS. 1 through 5, like numbers are used to designate like components. In general, the alternative embodiment utilizes the identical principles hereberfore disclosed for generating increased synchronizer torque capacity for a given input force.

With continued reference to FIGS. 6, 7A and 7B, blocker ring 102 is shown to include a plurality of three (3) raised longitudinally extending drive tangs 104 which are equally spaced at 120° intervals therearound. Drive tangs 104 are adapted to nest within complimentary apertures, such as notches 106, formed in cylindrical portion 35 of hub external splined surface 36. As shown, annular thrust spring 84 is slidably received on an outer radial surface of drive tangs 104 in a snug press-fit manner.

Each drive tang 104 is shown to include at least one angled cam edge surface adapted for engaging a similarly angled side wall surface of notch 106. More particularly, each drive tang 104 defines a pair of forward-angled cam edges 108 and 110 which converge outwardly from centerline 112 at acute angle "X", the preferred range of which having been hereberfore disclosed. Likewise, notch 106 defines opposed angled side walls 114 and 116 extending at acute angle "Y" for permitting sliding movement of drive tangs 104 relative to notches 106.

As previously described, initial "cone" torque causes blocker ring 102 to "clock" to its indexed position such that forward-angled cam edges 108 engage angled side walls 114 of notches 106. This sliding engagement acts to draw cone surface 44 into tighter frictional engagement with friction surface 46. As noted, such tighter "clamping" engagement acts to amplify the synchronizer torque generated in response to a given input force.

While both of the preferred embodiments disclose acute angles "X" and "Y" in the range of about 5° to 20°, other angles may be used depending on various factors such as the type of friction materials used for the friction pad or lining on friction surface 46. Thus, the angular configuration of the drive tang cam edges may be within any suitable range without departing from the fair scope of the present invention. Likewise, it is to be understood that the complimentary angled side walls are preferably formed at a substantially matching acute angle equal to the selected angle "X".

While the specific embodiments of the invention have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

What is claimed is:

1. A synchronizer apparatus for use in a transmission having a transmission shaft, said synchronizer apparatus having an externally splined hub fixed for rotation on said transmission shaft, a first gear journally mounted on said transmission shaft adjacent one axial side of said hub and having an externally splined surface, a shift sleeve having an internally splined surface slidably coupled to said hub externally splined surface and being axially movable thereon in a first direction from a neutral position to a first operative position wherein said shift sleeve internally splined surface engages said first gear externally splined surface for operatively coupling said first gear for rotation with said transmission shaft, a blocker ring having one of first friction surface means and first cone surface means formed thereon which is adapted to frictionally engage the other of said first friction surface means and said first conical surface means formed on said first gear for developing synchronizing torque therebetween upon energization of said synchronizer apparatus, and thrust means associated with said shift sleeve and said blocker ring for energizing said synchronizer apparatus upon axial shifting operation of said shift sleeve in said first direction, the improvement comprising:

torque amplification means operatively interconnecting said blocker ring and said hub for causing said blocker ring to move axially relative to said first gear for generating increased frictional engagement between said first conical surface means and said first friction surface means, said torque amplification means including a plurality of longitudinally extending drive tangs formed on said blocker ring and adapted to project into associated aperture means formed in said hub, said drive tangs having an edge surface which defines a first acute angle with respect to a longitudinal axis of said shaft, and said aperture means having side walls which define a second acute angle with respect to the longitudinal axis of said shaft, whereby the synchronizing torque developed by said synchronizer apparatus is increased with respect to a given input force exerted by a vehicle operator.

2. The transmission synchronizer apparatus of claim 1 wherein upon said shift sleeve being initially moved in said first direction said thrust means acts on said blocker ring such that said first friction surface means frictionally engages said first conical surface means for causing frictional engagement therebetween such that said blocker ring is rotated relative to said hub for causing said blocker ring cam surface means to slidingly engage said angled side walls of said hub.

3. The transmission synchronizer apparatus of claim 2 wherein said edge surface defines a forward-angled cam edge which converges outwardly at said first acute angle, and wherein said angled side walls of said aperture means converge outwardly at said second acute angle.

4. The transmission synchronizer apparatus of claim 2 wherein said drive tangs are formed symmetrically about a longitudinal axis of symmetry such that said edge surface defines a pair of forward-angled cam edges which converge outwardly at said first acute angle, and wherein said angled side walls define a pair of symmetrically disposed side walls converging outwardly at said second acute angle such that said second acute angle is substantially equal to said first acute angle.

5. The transmission synchronizer apparatus of claim 4 wherein said blocker ring has three drive tangs uniformly spaced on 120° centers and which extend longitudinally toward said hub, and wherein said aperture means is formed on a radially extending web portion of said hub.

6. The transmission synchronizer apparatus of claim 4 wherein said blocker ring has three drive tangs uniformly spaced on 120° centers and which extend longitudinally toward said hub, and wherein said aperture means includes three notches formed on an axially extending cylindrical portion of said hub which are adapted to receive said drive tangs therein.

7. The transmission synchronizer apparatus of claim 4 wherein said first and second acute angles are substantially equal and are in the range of about 5° to 20°.

8. In a synchronizer and gear assembly comprising: a longitudinally extending transmission shaft with at least one ratio gear journally mounted on said shaft, an externally splined hub fixed on said shaft and a shift sleeve having internal splines coupled to said hub external splines for slidable movement thereon to an operative position for engaging said ratio gear so as to couple said ratio gear in rotation with said shaft, a blocker ring having an internal friction surface adapted to frictionally engage an external cone surface formed on said ratio gear, a thrust mechanism disposed between said shift sleeve and said blocker ring for energizing said assembly upon sliding movement of said shift sleeve toward said ratio gear, an improvement wherein said blocker ring has a plurality of axially extending drive tangs which project into complementary aperture means formed in said hub, said drive tangs having an edge surface which converges outwardly at a first acute angle with respect to the longitudinal axis of said shaft, said aperture means including an angled side wall converging outwardly at a second acute angle with respect to the longitudinal axis of said shaft, and wherein upon said shift sleeve being initially moved said thrust mechanism causes said blocking ring internal friction surface to frictionally engage said ratio gear external conical surface such that said blocker ring is rotated relative to said hub, whereby said edge surface of said drive tangs slidably engages said angled side wall such that said sliding engagement acts to draw said blocker ring toward said ratio gear so as to generate greater frictional engagement between said blocker ring internal frictional cone surface and said ratio gear external cone surface, whereby the frictional cone torque developed by said assembly is increased for a given synchronizer axial input force.

9. The synchronizer and gear assembly of claim 8 wherein said blocker ring has a plurality of at least three drive tangs uniformly spaced at 120° centers, and wherein said aperture means is formed on a radially extending web portion of said hub.

10. The synchronizer and gear assembly of claim 8 wherein said blocker ring has a plurality of at least three drive tangs spaced at 120° centers, and wherein said aperture means comprises at least three complimentary notches formed in an axially extending cylindrical portion of said hub.

11. The synchronizer and gear assembly of claim 8 wherein said edge surfaces of said drive tangs are formed at said first acute angle in the range of about 5° to 20°.

12. The synchronizer and gear assembly of claim 11 wherein said edge surfaces of said drive tangs are formed at said first acute angle in the range of about 8° to 10°, and wherein said second acute angle is substantially equal to said first acute angle.

* * * * *